United States Patent
Mahajan et al.

(10) Patent No.: US 8,856,776 B2
(45) Date of Patent: Oct. 7, 2014

(54) UPDATING FIRMWARE WITHOUT DISRUPTING SERVICE

(75) Inventors: Ajay Kumar Mahajan, Austin, TX (US); Atit D Patel, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1325 days.

(21) Appl. No.: 12/366,175

(22) Filed: Feb. 5, 2009

(65) Prior Publication Data

US 2010/0199272 A1    Aug. 5, 2010

(51) Int. Cl.
G06F 9/445 (2006.01)
G06F 11/20 (2006.01)

(52) U.S. Cl.
CPC .............. *G06F 8/67* (2013.01); *G06F 11/2038* (2013.01); *G06F 11/2023* (2013.01)
USPC ........................................................ 717/173

(58) Field of Classification Search
USPC ................................................. 717/168, 171
See application file for complete search history.

(56) References Cited

U.S. PATENT DOCUMENTS

| | | | |
|---|---|---|---|
| 6,640,334 B1 | 10/2003 | Rasmussen | |
| 6,944,854 B2 | 9/2005 | Kehne et al. | |
| 7,240,188 B2 * | 7/2007 | Takata et al. | 713/1 |
| 2006/0025875 A1 * | 2/2006 | Smith et al. | 700/86 |
| 2006/0271244 A1 * | 11/2006 | Cumming et al. | 700/291 |
| 2007/0226413 A1 | 9/2007 | Elliott et al. | |

FOREIGN PATENT DOCUMENTS

JP    2003113282    4/2003

OTHER PUBLICATIONS

Adya et al; Architecture and Techniques for Diagnosing Faults in IEEE 802.11 Infrastructure Networks, MobiCom'04, Sep. 26-Oct. 1, 2004, 30-44, Philadelphia, Pennsylvania, USA.
Cardell-Oliver et al; Conformance Test Experiments for Distributed Real-Time Systems, 2002, 159-163, Crawley, Western Australia.
Pinheiro et al; Exploiting Redundancy to Conserve Energy in Storage Systems, SIG Metrics/Performance'06, Jun. 26-30, 2006, 15-26, Saint Malo, France.

\* cited by examiner

*Primary Examiner* — Li B Zhen
*Assistant Examiner* — Joanne Macasiano
(74) *Attorney, Agent, or Firm* — Garg Law Firm, PLLC; Rakesh Garg; Parashos Kalaitzis

(57) ABSTRACT

A method, system, and computer usable program product for updating firmware without disrupting service are provided in the illustrative embodiments. An updated firmware code is sent to a first firmware component and a second firmware component. The first firmware component is a primary firmware component and the second firmware component is a backup firmware component in a redundant firmware configuration. The updated firmware code is installed in second firmware component. The updated firmware code is activated in a third firmware component. The third firmware component is in communication with the first firmware component. A fail-over from the first firmware component to the second firmware component is performed such that a user communicating with the data processing system and receiving a service using the first firmware component continues to receive the service using the second firmware component without a disruption in the service.

14 Claims, 7 Drawing Sheets

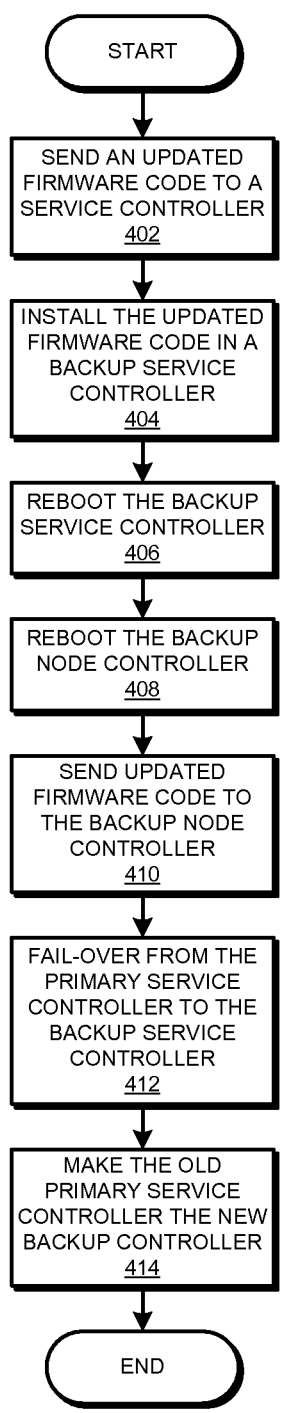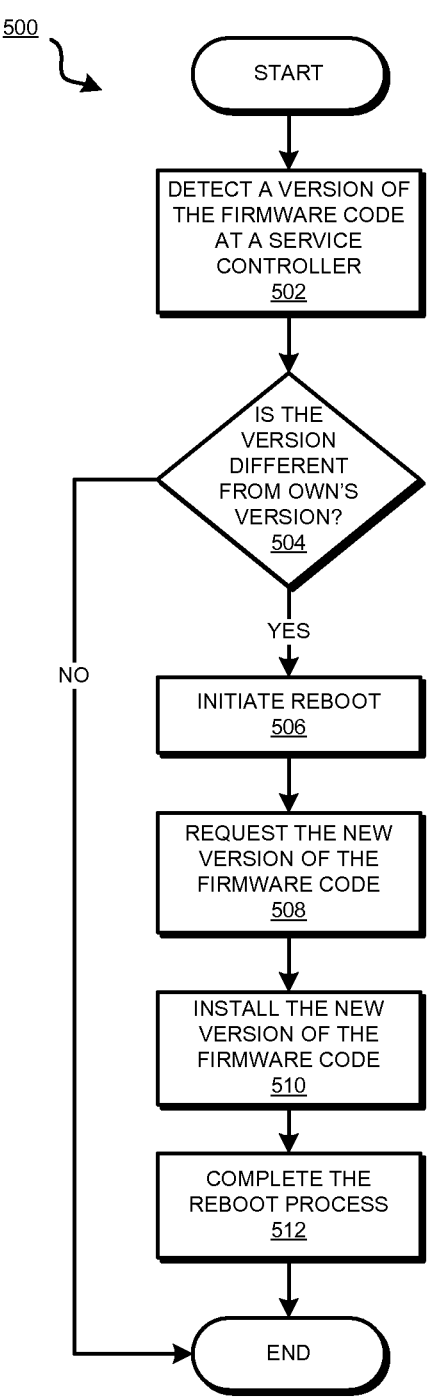
FIG. 4
FIG. 5

UPDATING FIRMWARE WITHOUT DISRUPTING SERVICE

BACKGROUND OF THE INVENTION

1. Field of the Invention

The present invention relates generally to an improved data processing system, and in particular, to a computer implemented method for updating data processing system components. Still more particularly, the present invention relates to a computer implemented method, system, and computer usable program code for updating firmware without disrupting service.

2. Description of the Related Art

Data processing environments can be configured using a variety of data processing systems. Some data processing systems may themselves include several components such that a component is capable of operating as a data processing system on its own. For example, data processing systems can be divided into logical partitions (LPAR). A logical partition is also known simply as a partition, and as a node. Each node operates as a separate data processing system independent of the other nodes. Generally, a partition management firmware connects the various nodes and provides the network connectivity among the nodes. Hypervisor is an example of such partition management firmware.

Thus, a data processing environment may include data processing systems and network components. For example, a data processing environment may include commonly known server computers, desktop computers, and laptop computers, and bridges, routers, and switches. The data processing environment may also include data processing systems that may be configured to include one or more nodes. The data processing environment may interconnect these devices using a variety of data communication protocols in a wired or wireless manner.

A node may include a copy of an operating system. A node may execute software applications, alone or in conjunction with other nodes and data processing systems. A node may also include a set of computing resources that are available for that node's use, such as to execute the applications. A set of computing resources is one or more types of computing resources. A block of memory space is an example of a computing resource. A file in a file system is another example of a computing resource. Hard disk space, network bandwidth, one or more processors, processor cycles, and input/output (I/O) devices are some other examples of computing resources.

Firmware is a component that includes hardware and software as a unit. In some instances, firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). In a data processing system, such as a node, firmware provides hardware components and software applications the capability to access the data processing system hardware. A data processing system may include more than one firmware components.

Software of a firmware may be updated from time to time. Updates to the firmware in this manner may be used to correct faulty operation, add support for new or changed hardware components, add support for new hardware or software technologies, and many other purposes. Updating software in a firmware presently requires reboot of the data processing system. Rebooting is the process of restarting the hardware and the operating system of a data processing system. Rebooting a data processing system disrupts services being provided by the data processing system as the applications have to be shut down for the reboot and restarted upon completion of the rebooting process.

SUMMARY OF THE INVENTION

The illustrative embodiments provide a method, system, and computer usable program product for updating firmware without disrupting service in a data processing system. An updated firmware code is sent to a first firmware component and a second firmware component. The first firmware component is a primary firmware component and the second firmware component is a backup firmware component in a redundant firmware configuration. The updated firmware code is installed in second firmware component. The updated firmware code is activated in a third firmware component. The third firmware component is in communication with the first firmware component. A fail-over from the first firmware component to the second firmware component is performed such that a user communicating with the data processing system and receiving a service using the first firmware component continues to receive the service using the second firmware component without a disruption in the service.

In one embodiment, activating the updated firmware code in the third firmware component may further include sending the updated firmware code to the third firmware component. The updated firmware code may be installed in the third firmware component. The third firmware component may be booted up with the updated firmware code.

In another embodiment, a detection may be made at a fourth firmware component, that the first firmware component includes the updated firmware code. The fourth and the first firmware components may be in communication with each other. A request responsive to the detecting may be made at the fourth firmware component for the updated firmware code from the first firmware component. The fourth firmware component may be rebooted with the updated firmware code.

In another embodiment, the first firmware component may be a primary service controller, and the second firmware component may be a backup service controller. Additionally, an instruction directed at the first firmware component may be queued. Following performing the fail-over, the instruction may be processed at the second firmware component.

In another embodiment, a snapshot may be taken of several firmware components active in a network supported by the first and the second firmware components. The several firmware components may include several node controllers. Following performing the fail-over, a verification may be made that the several firmware components are active in the network and communicating with the second firmware component.

In another embodiment, performing the fail-over may result from an instruction to fail-over from another data processing system, the second firmware component detecting a change in a code of the second firmware, or a combination thereof.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 4 depicts a flowchart of a process of updating firmware without service disruption in accordance with an illustrative embodiment;

FIG. 5 depicts a flowchart of a process of updating the firmware of a node controller in accordance with an illustrative embodiment;

DETAILED DESCRIPTION OF THE PREFERRED EMBODIMENT

Figure 1:
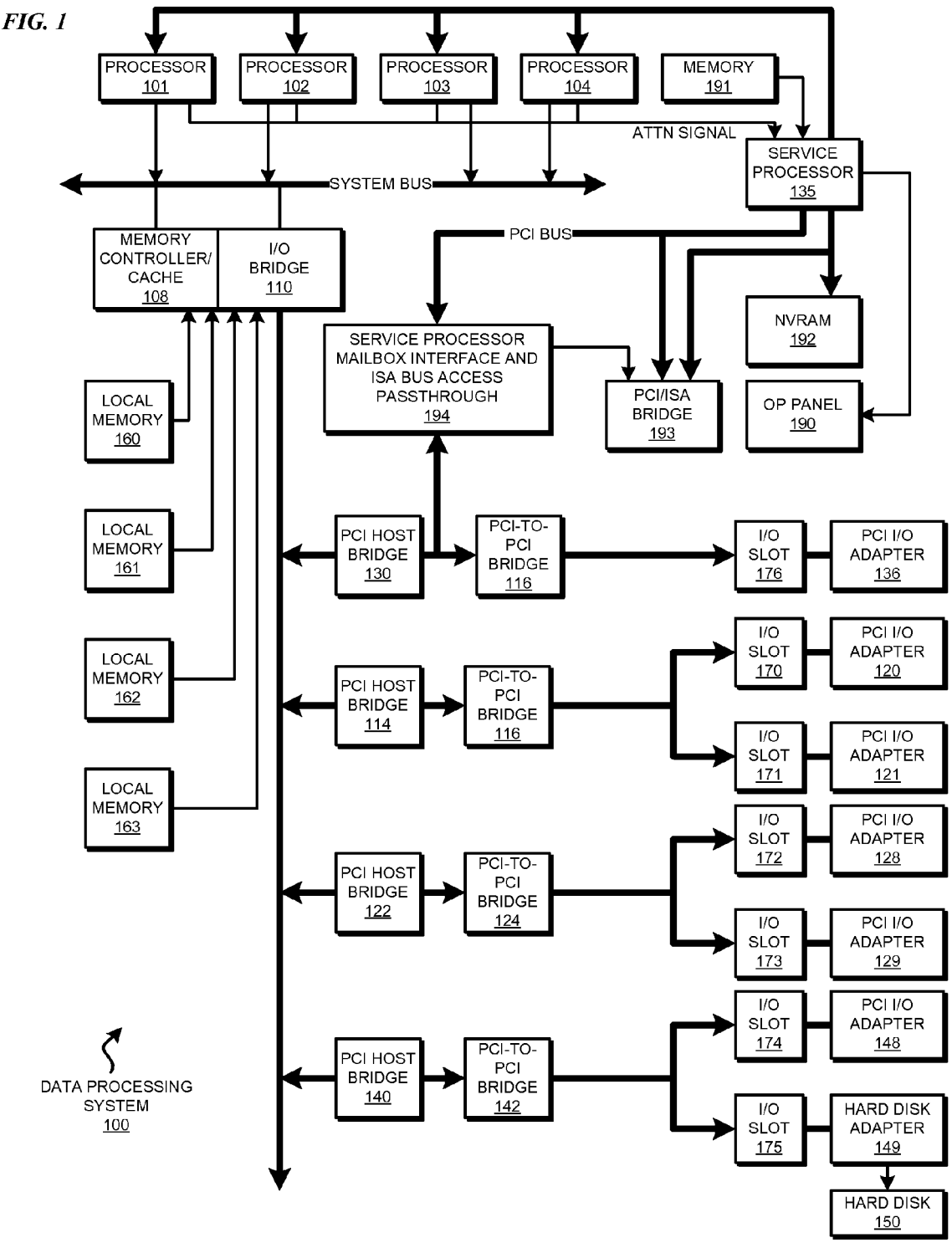
FIG. 1 depicts a block diagram of a data processing system in which the illustrative embodiments may be implemented is depicted.

The illustrative embodiments recognize that due to the nature of certain firmware in a data processing system, updates to firmware, such as software updates, presently disrupt services being provided by the data processing system. For example, in some instances, a firmware update requires rebooting the data processing system.

In certain data processing environments, service disruption is not an acceptable consequence of firmware updates. For example, a high availability system is a data processing system that is configured to be operational above a threshold service level requirement. A high availability system is expected to tolerate system faults, system changes, and network disruptions without compromising user-experience. However, even a high availability system includes firmware that has to be updated from time to time. The illustrative embodiments recognize that firmware updates cause service disruptions in high availability systems as well.

As another example, certain data processing system may be configured to support business critical transactions. Often, such systems are configured to include surplus computing power and redundant computing resources. For example, such a data processing system may include several nodes, and several processors in some of the nodes. The illustrative embodiments recognize while such configurations may suffice for insuring application performance, simply providing excess resources is insufficient for preventing a service disruption due to firmware update.

The illustrative embodiments recognize that updating the firmware is fundamentally different from updating the code of an application. Presently, technological solutions exist to update the code of the applications executing on a data processing system without rebooting the data processing system of resetting the operating system. However, presently, firmware updates require a reboot of the data processing system that causes the disruption of services described above.

To address these and other problems associated with updating firmware, the illustrative embodiments provide an improved method, system, and computer usable program product for updating firmware without disrupting service in a data processing system. According to the illustrative embodiments, a data processing system, such as a node, can continue providing the services to a user during a firmware update.

For example, a node using the illustrative embodiments may be executing an application that a user may be using. When a firmware in such a node is updated according to the illustrative embodiments, the node can continue to execute the application and the user may not experience any disruption in the user's interactions with the application. By using the illustrative embodiments, a user, a system, or an application may be able to interact with a data processing system, the data processing system's components, applications executing thereon, and applications using services of the data processing system, without learning that the data processing system's firmware has been updated.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

The illustrative embodiments are described in some instances using particular data processing systems and environments only as an example for the clarity of the description. The illustrative embodiments may be used in conjunction with other comparable or similarly purposed architectures within the scope of the illustrative embodiments.

Figure 2:
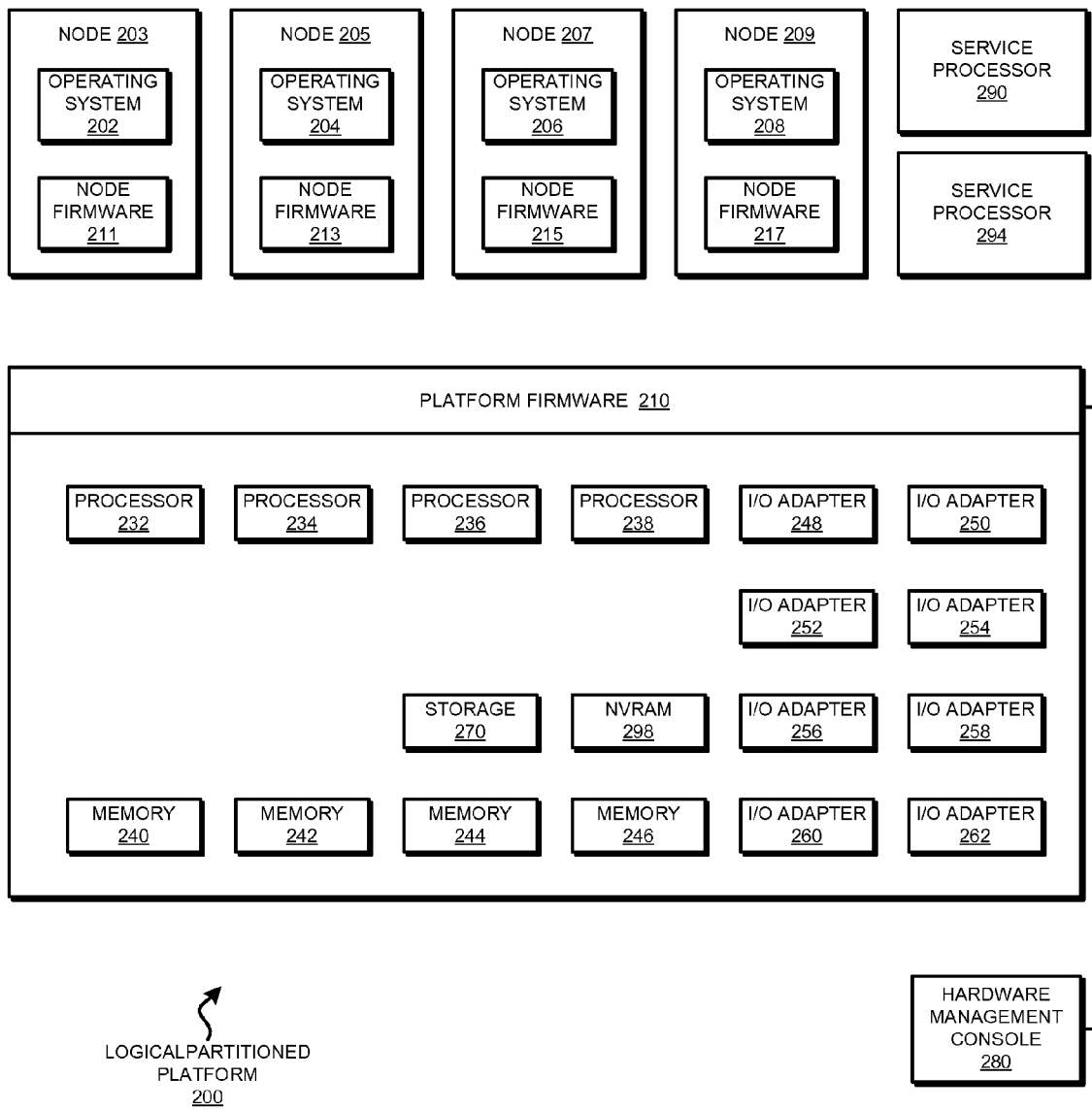
FIG. 2 a block diagram of an example logical partitioned platform is depicted in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of a data processing system in which the illustrative embodiments may be implemented is depicted. Data processing system 100 may be a symmetric multiprocessor (SMP) system including a plurality of processors 101, 102, 103, and 104, which connect to system bus 106. For example, data processing system 100 may be an IBM eServer® implemented as a server within a network. (eServer is a product and e(logo)server is a trademark of International Business Machines Corporation in the United States and other countries). Alternatively, a single processor system may be employed. Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logical partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects for a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to each of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX®) operating system may be executing within partition P1, a second instance (image) of the AIX operating system may be executing within partition P2, and a Linux® or OS/400® operating system may be operating within logical partition P3. (AIX and OS/400 are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128-129. PCI I/O adapters 128-129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for a PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through logic 194 and PCI-to-PCI bridge 132.

Service processor mailbox interface and ISA bus access pass-through logic 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the illustrative embodiments.

With reference to FIG. 2, this figure depicts a block diagram of an example logical partitioned platform in which the illustrative embodiments may be implemented. The hardware in logical partitioned platform 200 may be implemented as, for example, data processing system 100 in FIG. 1.

Logical partitioned platform 200 includes node hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor. OS/400 is used only as an example in these illustrative embodiments. Of course, other types of operating systems, such as AIX and Linux, may be used depending on the particular implementation. Operating systems 202, 204, 206, and 208 are located in nodes 203, 205, 207, and 209. Hypervisor software is an example of software that may be used to implement partition management firmware 210 and is available from International Business Machines Corporation.

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes several processors 232-238, several system memory units 240-246, several input/output (I/O) adapters 248-262, and a storage unit 270. Each of the processors 232-238, memory units 240-246, NVRAM storage 298, and I/O adapters 248-262 may be assigned to one of multiple nodes within logical partitioned platform 200, each of which corresponds to one of operating systems 202, 204, 206, and 208.

Partition management firmware 210 performs a number of functions and services for nodes 203, 205, 207, and 209 to create and enforce the partitioning of logical partitioned platform 200. Partition management firmware 210 is a firmware implemented virtual machine analogous to the underlying hardware. Thus, partition management firmware 210 allows the simultaneous execution of independent OS images 202, 204, 206, and 208 by virtualizing all the hardware resources of logical partitioned platform 200.

Service processors 290 and 294 may be used to provide various services, such as processing of platform errors in the nodes. These services also may act as a service agent to report errors back to a vendor, such as International Business Machines Corporation. Operations of the different nodes may be controlled through a hardware management console, such as hardware management console 280. Hardware management console 280 may be a separate or associated data processing system from which a system administrator may perform various functions including reallocation of resources to different nodes.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. Partitioned platform 200 is used only as an example of a data processing system in which the illustrative embodiments may be implemented. An implementation of the illustrative embodiments may also use alternative architectures for updating firmware without departing from the scope of the illustrative embodiments.

Figure 3:
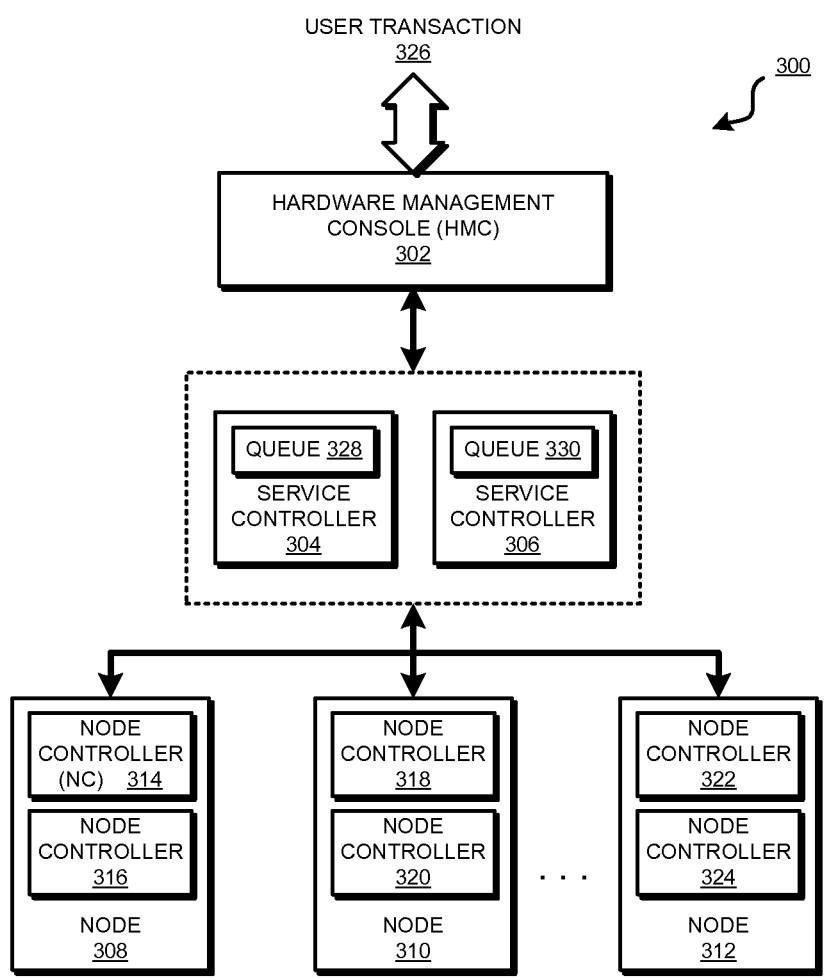
FIG. 3 depicts a block diagram of a data processing system configuration in which the illustrative embodiments may be implemented.

With reference to FIG. 3, this figure depicts a block diagram of a data processing system configuration in which the illustrative embodiments may be implemented. Data processing system 300 may be implemented using logical partitioned platform 200 in FIG. 2.

Hardware management console (HMC) 302 may be analogous to hardware management console 280 in FIG. 2. Service controllers 304 and 306 may be similar to service processors 290 and 294 in FIG. 2. Nodes 308, 310, and 312 may each be similar to any of nodes 203, 205, 207, or 209 in FIG. 2.

Node 308 may include redundant node controllers 314 and 316. Node controllers 314 and 316 may be part of the node firmware of node 308, such as node firmware 211 is a part of node 203 in FIG. 2. Node controllers 314 and 316 are each capable of controlling devices hardware in node 308. Node controllers 314 and 316 are redundant in that they can each be a primary node controller for node 308, and each of node controllers 314 and 316 can be a backup for the other if the other is the primary. In other words, at any given time, one of node controllers 314 and 316 functions as the primary node controller for node 308, and the remaining node controller functions are a backup node controller for node 308.

Node 310 is similarly configured with node controllers 318 and 320. Node 312 is configured with node controllers 322 and 324. Node controllers 318, 320, 322, and 324 function in a manner analogous to node controllers 314 and 316.

Data processing system 300 further includes redundant service controllers 304 and 306 that function in similar primary and backup roles. For example, when service controller 304 is handling user interactions 326, service controller 306 remains ready as a backup service controller. Queue 328 in service controller 304 is configured to queue user transactions 326 so that service controller 304 may distribute the tasks related to user transactions 326 to one of nodes 308, 310, and 312 for processing. Queue 330 is similarly configured in service controller 306.

Data processing system 300 is depicted with three nodes only as an example. Any number of nodes can be present in a given data processing system to implement the illustrative embodiments. Furthermore, an embodiment may include more than two service controllers in a redundant configuration within the scope of the illustrative embodiments. Additionally, a node can be configured with redundant node controllers in any manner suitable for a particular implementation within the scope of the illustrative embodiments.

With reference to FIG. 4, this figure depicts a flowchart of a process of updating firmware without service disruption in accordance with an illustrative embodiment. Process 400 may be implemented using data processing system 300. For example, process 400 may be implemented in hardware management console 302, or a combination of service controller 306 and hardware management console 302 in FIG. 3.

Process 400 begins by sending an updated firmware code to a service controller (step 402). Process 400 may send the updated firmware code to the set of service controllers, or a subset thereof. A set of service controllers is two or more service controllers. For example, hardware management console 302 in FIG. 3 may send the updated firmware code of step 402 to service controller 304, service controller 306, or both service controllers 304 and 306 in FIG. 3.

Process 400 installs the updated firmware code in a backup service controller (step 404). As an example, service controller 306 in FIG. 3 may be functioning as the backup service controller at the time of the installation of step 404. Accordingly, process 400 may install the updated firmware code in service controller 306.

Process 400 reboots the backup service controller (step 406). A primary service controller may be handling the user transactions during the execution of process 400. Because the firmware of the backup service controller is updated in process 400, rebooting the backup service controller does not disrupt any services a user may be using through the primary service controller.

Process 400 reboots a backup node controller (step 408). Process 400 then sends the updated firmware code to the backup node controller being rebooted (step 410). For example, node controller 316 in FIG. 3 may be a backup node controller for node 308 in FIG. 3, and process 400 may send the updated firmware code to node controller 316 in FIG. 3.

Process 400 then performs a fail-over of services from the primary service controller to the backup service controller, the backup service controller having been updated as described in the above steps (step 412). Fail-over is a process of transitioning operations and functions from one data processing system to another. Fail-over from a primary service controller to a backup service controller transfers the service controller functions from the primary service controller to the backup service controller, without disruption of the functions or services. The primary and backup roles are switched and the service controller that was previously the backup takes over as the primary, and the service controller that was previously the primary can be made the backup or may be shut down, such as for maintenance. Node controllers can fail-over in a similar manner.

Process 400 makes the service controller that was the primary service controller at the beginning of process 400 the backup service controller, and makes the then-backup service controller the new primary service controller (step 414). Process 400 ends thereafter.

Thus, process 400 updates the firmware of a service controller without disrupting the functions and services being provided by the data processing system that may be using the service controller with the updated firmware. The firmware of a node controller is also updated in process 400 only as an example. An implementation may update a node controller in a separate process after the firmware of a service controller has been updated.

With reference to FIG. 5, this figure depicts a flowchart of a process of updating the firmware of a node controller in accordance with an illustrative embodiment. Process 500 may be implemented using a node controller, such as any of node controllers 314, 316, 318, 320, 322, or 324 in FIG. 3.

Process 500 begins by detecting a version of the firmware code at a service controller (step 502). For example, a node controller where process 500 may be executing may be in communication with a service controller. Process 500, executing on the node controller may perform the detection of step 502 with respect to such a service controller.

Process 500 determines whether the version of the firmware at the service controller is different from the version of the firmware at the node controller (step 504). If the versions are not different ("NO" path of step 504), process 500 ends thereafter. If the versions are different ("YES" path of step 504), process 500 initiates a reboot of the node controller (step 506).

In one embodiment, process 500 may execute in a backup node controller. In such an embodiment, rebooting of step 506 may not disrupt any services being provided by a corresponding primary node controller.

In another embodiment, process 500 may execute in a primary node controller. In such an embodiment, the rebooting of step 506 may trigger a fail-over from the primary node controller to a corresponding backup node controller. The fail-over may prevent any disruption of services being provided by the primary node controller.

Process 500 requests the new version of the firmware code (step 508). In one embodiment, the new version of the firmware code may be the same as the version of the service controller detected in step 502. In another embodiment, the new version of the firmware code may be a version that is suitable for use in a node controller to correspond to the version detected in a service controller in step 502.

Process 500 installs the new version of the firmware code on the node firmware (step 510). For example, the node controller that is rebooted in step 506 may be a part of the node firmware and may be the install location of the new firmware code.

Process 500 completes the reboot process (step 512). Process 500 ends thereafter. For example, upon rebooting, the updated firmware of the node controller may reestablish communication with one or more service controllers. An implementation of process 500 may perform any additional tasks, such as clean-up, re-establishing network, restarting applications, logging boot-up information, or any other actions or operations suitable for a particular implementation.

Figure 6:
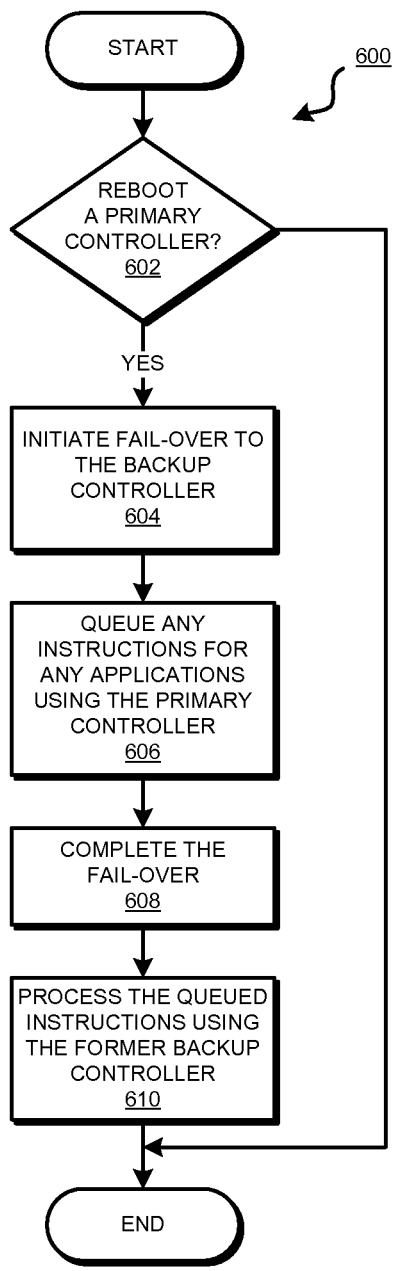
FIG. 6 depicts a flowchart of a process of controller failover in accordance with an illustrative embodiment.

With reference to FIG. 6, this figure depicts a flowchart of a process of controller fail-over in accordance with an illustrative embodiment. Process 600 may be implemented in a service controller, a node controller, a hardware management console, or a combination thereof. For example, service controllers 304 and 306, and hardware management console 302 in FIG. 3 may be used in one implementation of process 600. As another example, node controllers 314 and 316 in FIG. 3 may be used for implementing process 600.

Process 600 begins by determining whether a primary controller, such as a primary service controller, is to be rebooted (step 602). If the primary controller is not to be rebooted ("NO" path of step 602), process 600 ends. If the primary controller is to be rebooted ("YES" path of step 602), process 600 initiates a fail-over of the primary controller to the backup controller (step 604).

Process 600 may queue any instructions, commands, transactions, or other actions for any applications, users, or systems that may be using the primary controller at the time of the fail-over of step 604 (step 606). For example, if a primary service controller, such as service controller 304 in FIG. 3, fails-over to a backup service controller, such as service controller 306 in FIG. 3, process 600 may utilize queues 328 and 330 in FIG. 3 to queue user transactions 326 in FIG. 3.

Process 600 completes the fail-over (step 608). In one embodiment, completing a fail-over may require restoring a network topology of controllers to a configuration similar to the topology before the fail-over. In another embodiment, completing the fail-over may include confirming that the controller taking on the primary role is ready and available to provide the services. In another embodiment, completing a fail-over may include manipulating applications that were using the former primary controller to begin using the new primary controller.

These examples of completing a fail-over are not limiting on the illustrative embodiments. Many other actions and operations may be included in step 608 in a given implementation without departing from the scope of the illustrative embodiments.

Process 600 may then process the queued instructions or transactions using the former backup, now the primary, controller (step 610). Process 600 ends thereafter. Process 600 of a controller fail-over can be used for failing-over any controller, including service controller and node controller.

Figure 7:
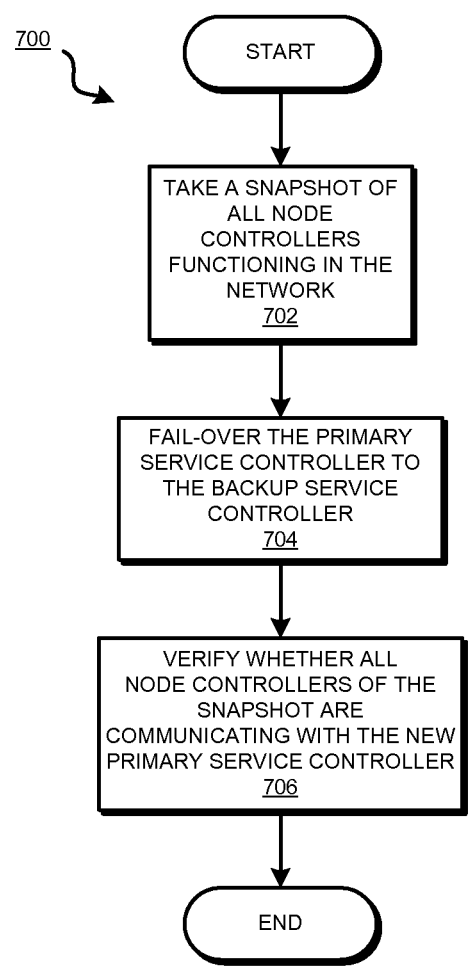
FIG. 7 depicts a flowchart of a process of failing-over a service controller in accordance with an illustrative embodiment.

With reference to FIG. 7, this figure depicts a flowchart of a process of failing-over a service controller in accordance with an illustrative embodiment. Process 700 may be implemented using primary and backup service controllers, such as service controllers 304 and 306 in FIG. 3. Additionally, if process 600 in FIG. 6 is implemented for failing-over a service controller, steps of process 700 can be implemented interleaved with steps of process 600 in FIG. 6.

Process 700 begins by taking a snapshot of a node controllers functioning in the network supported by the primary service controller (step 702). A snapshot is a record of any kind that represents a network topology of node controllers at a given time. As an example, an implementation of process 600 in FIG. 6 and process 700 may implement step 702 before step 608 in FIG. 6.

Process 700 then fails over the primary service controller to the backup service controller (step 704). Step 704 may include one or more steps described with respect to process 600 in FIG. 6.

Process 700 verifies whether all the node controllers of the snapshot are communicating with the former backup, now the new primary, service controller, after the fail-over is complete (step 706). Process 700 ends thereafter. As an example, an implementation of process 600 in FIG. 6 and process 700 may implement step 706 before step 610 in FIG. 6.

The ordering of the steps in a combined implementation of process 600 in FIG. 6 and process 700 in FIG. 7 described above is only an example and is not intended to be limiting on the illustrative embodiments. A particular implementation may combine processes 600 and 700 in other order of the steps and may include additional steps within the scope of the illustrative embodiments.

Figure 8:
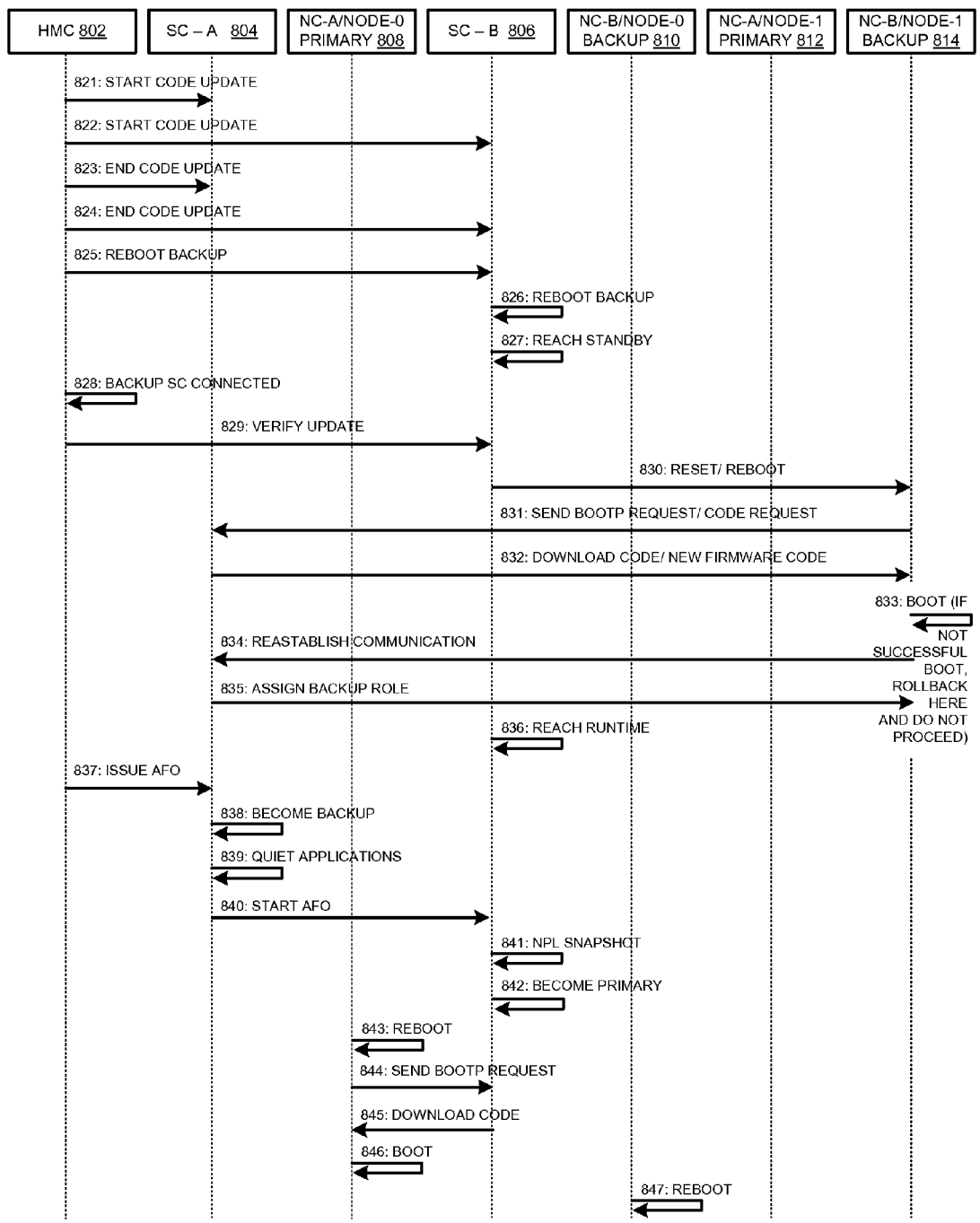
FIG. 8 depicts an example implementation of the overall process of updating firmware without disrupting service to a user in accordance with an illustrative embodiment.
Figure 8:
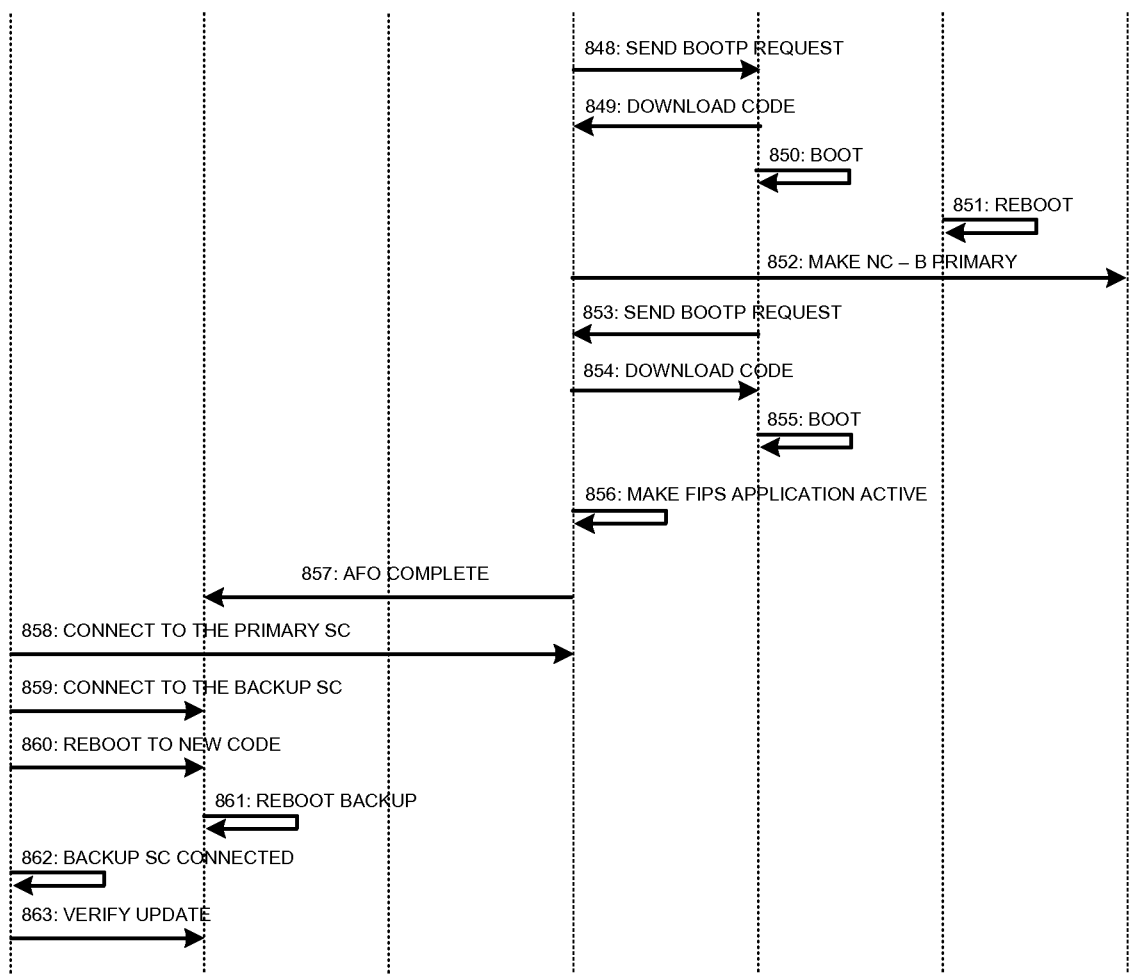

With reference to FIG. 8, this figure depicts an example implementation of the overall process of updating firmware without disrupting service to a user in accordance with an illustrative embodiment. Process 800 may be implemented using a data processing system, such as logical partitioned platform 200 in FIG. 2. Process 800 may be implemented using processes 400, 500, 600, and 700 in FIGS. 4, 5, 6, and 7 respectively. Process 800 includes steps of these processes as modified, adapted, altered, configured, and arranged as may be suitable in a particular implementation as an example. Other implementations of processes 400, 500, 600, and 700 in FIGS. 4, 5, 6, and 7 respectively may combine the various steps in a manner different from process 800 without departing the scope of the illustrative embodiments.

Process 800 contemplates hardware management console 802 being analogous to hardware management console 302 in FIG. 3. Process 800 further uses service controller 804 designated as primary and labeled "SC-A", service controller 806 designated as backup and labeled "SC-B". service controllers 804 and 806 may be similar to service controllers 304 and 306 in FIG. 3.

Process 800 further uses node controller 808 labeled "NC-A/NODE-0" as a primary node controller for a node, NODE-0. Node controller 810 in process 800 is labeled "NC-B/NODE-0" and functions as a backup node controller for a node, NODE-0. Node controllers 808 and 810 may be similar to node controllers 314 and 316 for node 308 in FIG. 3.

Process 800 further uses node controller 812 labeled "NC-A/NODE-1" as a primary node controller for a second node, NODE-1. Node controller 814 in process 800 is labeled "NC-B/NODE-1" and functions as a backup node controller for a node, NODE-1. Node controllers 812 and 814 may be similar to node controllers 318 and 320 for node 310 in FIG. 3.

Process 800 begins with hardware management console 802 starting a firmware code update. Hardware management console 802 sends firmware code update to service controller 804 (step 821). Hardware management console 802 sends firmware code update to service controller 806 (step 822). Hardware management console indicates an end of the sending of the code update to service controller 804 (step 823). Hardware management console indicates an end of the sending of the code update to service controller 806 (step 824).

Hardware management console 802 instructs service controller 806, the backup service controller, to reboot (step 825). Service controller 806 performs the reboot (step 826). Service controller 806 reaches a standby mode upon the completion of the reboot (step 827). A standby mode is a state of a device where the device may not be presently utilized for operations but the device may be ready to perform operations as and when needed.

Hardware management console 802 verifies that service controller 806, the backup service controller, has reconnected with hardware management console 802 after the reboot with the updated firmware code (step 828). Hardware management console 802 verifies that the firmware code update has loaded correctly on service controller 806 (step 829). At this point in process 800, the firmware of service controller 806 has been updated to a new version of code without any user connected to hardware management console 802 being affected by the firmware update.

Next, service controller 806 instructs node controller 814, a backup node controller, to reboot (step 830). Service controller 806 may instruct any backup node controller of any node in a given configuration to reboot in a manner similar to step 830. Node controller 814 is only selected as an example to illustrate the operation of process 800 with clarity. For example, service controller 806 could instruct node controller 810 instead of node controller 814 to reboot in step 830 within the scope of the illustrative embodiments.

Node controller 814, upon receiving the instruction to reboot in step 830, sends a boot protocol (BOOTP) request to service controller 804, the primary service controller with which node controller 814 may be in communication (step 831). The BOOTP request in step 831 may include a request for firmware code from service controller 804 to ensure that node controller 814 receives any updates to the firmware code that service controller 804 may have received since node controller 814 last booted up.

In response to the BOOTP request of step 831, service controller 804 provides the new firmware code that service controller 804 received in step 821 to node controller 814 (step 832). Node controller 814 boots up with the updated firmware code so received from service controller 804 (step 833). If the boot up process fails with the firmware code update, process 800 can rollback the firmware code update and reboot node controller 814 with the previously working version of firmware code and end thereafter.

If the reboot with the updated firmware code is successful at node controller 814, node controller 814 reestablishes communication with service controller 804, the primary service controller, (step 834). Service controller 804 assigns node controller 814 the backup role node controller 814 was previously performing (step 835). At this time in process 800, service controller 806, a backup service controller, and node controller 814, a backup node controller at one of the nodes, have had their firmware updated without disrupting any services to any user.

Service controller 806 revives from the standby mode to a runtime mode to take over operations of service controller 804, such as by a fail-over (step 836). As an example, hardware management console 802 may instruct service controller 806 to reach the runtime mode of step 836.

Hardware management console issues an administrative fail-over command (AFO) to service controller 804 (step 837). Service controller 804 assumes the role of a backup service controller (step 838). Service controller 804 quiets any applications using service controller 804 (step 839). To quiet an application is to hold the application's processes in abeyance, such as by queuing the application's instructions or operations directed at a service controller.

Service controller 804, the new backup service controller, starts the administrative fail-over to service controller 806, the former backup service controller that is to become the primary service controller, (step 840). Service controller 806 takes a snapshot of the node controllers that are active in the data processing environment serviced by service controllers 804 and 806 (step 841). Service controller 806 becomes the primary service controller (step 842). At this point in process 800, a user's services are transferred and supported without any interruptions by a service controller whose firmware has been updated.

Furthermore, the node controllers that are active in the data processing environment are now communicating with service controller 806 as the primary service controller. Some of the active node controllers, such as node controllers 808, 810, and 812 detect that they are communicating with a new primary service controller, service controller 806, whose firmware is at a code version different from the node controllers' own firmware code version. Other active node controllers, such as node controller 814 may not detect any version difference between the firmware codes of the node controller and the primary service controller, having previously updated their firmware as in steps 830-833.

Upon detecting that the firmware version of a node controller is different from the firmware version of the new primary service controller, the node controllers reboot. Node controllers may coordinate the timing of their rebooting with one another, or a service controller may instruct the node controllers about the order in which to reboot.

As an example, Node controller 808, the primary node controller for NODE-0 may reboot (step 843). Node controller 808 may fail-over to node controller 810 before rebooting and node controller 810 may assume the primary role for NODE-0. Node controller 808 may send a BOOTP request to service controller 806, the new primary service controller, in a manner similar to step 831 (step 844). Node controller 808 may download the updated firmware code from service controller 806 in a manner similar to step 832 (step 845). Node controller 808 boots up with the updated firmware code so downloaded (step 846).

Node controller 810, the new primary node controller for NODE-0 as a result of a fail-over before node controller 808 rebooted, may reboot (step 847). Node controller 810 may also send a BOOTP request to service controller 806 (step 848). Node controller 810 may also download the updated firmware code from service controller 806 (step 849). Node controller 810 boots up with the updated firmware code so downloaded (step 850).

As another example, to illustrate the various mechanisms by which node controllers may reboot, node controller 812, the primary node controller for NODE-1, may prepare for rebooting differently. Node controller 812 may reboot (step 851). In this alternative mechanism, service controller 806, the new primary service controller, may instruct node controller 814 to assume the primary node controller role for NODE-1 before node controller 812 shuts down for rebooting with the new firmware code (step 852). Instruction from service controller 806 to assume the primary role may substitute an automatic fail-over, as was the case when node controller 808 rebooted.

Node controller 812 may also send a BOOTP request to service controller 806 (step 853). Node controller 812 may also download the updated firmware code from service controller 806 (step 854). Node controller 812 boots up with the updated firmware code so downloaded (step 855). Firmware of Node controller 814 was previously updated in steps 830-833, therefore, node controller 814 need not reboot.

Service controller 806 reactivates the applications that were quieted in step 839 (step 856). Service controller 806 informs hardware management console 802 that the administrative fail-over is complete (step 857). Hardware management console 802 connects to service controller 806 as the primary service controller (step 858).

At this time in process 800, all node controllers have updated their firmware to the new version of firmware code. Service controllers have failed-over to a service controller that has been updated to the new firmware code version. Note that all the firmware updates have been performed while the data processing system is providing services to users and without disrupting any of those services to the users.

Hardware management console 802 connects to former primary service controller 804 as the new backup service controller (step 859). Hardware management console 802 instructs service controller 804 to reboot to the new firmware code version sent to service controller 804 in step 821 (step 860). Service controller 804 may reboot with the new version of the firmware code (step 861). Hardware management console 802 may verify that backup service controller 804 has reconnected after booting up with the new firmware code (step 862). Hardware management console 802 may verify that service controller 804's firmware has been updated (step 863).

At this point in process 800, all service controllers and all node controllers have been updated to a new version of the firmware without any service disruption. Following step 863, process 800 may include a second administrative fail-over from service controller 806, the new primary service controller, to service controller 804, the old primary service controller. Such steps would essentially mirror steps 836-842, and 856-857. Upon the administrative fail-over back to service controller 804, the data processing system where process 800 may be executing will have returned service processing to service controller 804, having updated all the firmware without any service disruption. Process 800 may end thereafter.

The components in the block diagrams and the steps in the flowcharts described above are described only as examples. The components and the steps have been selected for the clarity of the description and are not limiting on the illustrative embodiments. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the illustrative embodiments.

Thus, a computer implemented method, apparatus, and computer program product are provided in the illustrative embodiments for updating firmware without disrupting service in a data processing system. Using the illustrative embodiments, one or more firmware components in a data processing system can be updated in a way that a user communicating with the data processing system may not experience any service disruption.

The illustrative embodiments may be implemented in any data processing system, including distributed data processing systems that include redundant firmware. Backup firmware in the redundant firmware architecture is updated and assumes the role of the primary firmware. Then the primary firmware is updated. Any level of firmware hierarchy, such as firmware at the service controller level and firmware at the node controller level in a two level hierarchy, can be updated by systematically progressing the updates in the hierarchy in the manner of the illustrative embodiments.

The invention can take the form of an entirely hardware embodiment, an entirely software embodiment, or an embodiment containing both hardware and software elements. In a preferred embodiment, the invention is implemented in software, which includes but is not limited to firmware, resident software, and microcode.

Furthermore, the invention can take the form of a computer program product accessible from a computer-usable or computer-readable storage device providing program code for use by or in connection with a computer or any instruction execution system. For the purposes of this description, a computer-usable or computer-readable storage device can be any tangible apparatus that can contain, store the program for use by or in connection with the instruction execution system, apparatus, or device.

The storage device can be an electronic, magnetic, optical, electromagnetic, infrared, or semiconductor system (or apparatus or device). Examples of a computer-readable storage device include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD. The terms "computer-readable storage device," "computer-usable storage device," and storage device" do not encompass a signal propagation medium such as a copper cable, optical fiber, or wireless transmission medium, any description in this disclosure to the contrary notwithstanding.

Further, a computer-readable or computer-usable storage device may store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for updating firmware without disrupting service in a data processing system, the computer implemented method comprising:

sending, from a source, an updated firmware code to a first firmware component and a second firmware component, the first firmware component being a primary firmware component and the second firmware component being a backup firmware component in a redundant firmware configuration in the data processing system where an application is executing using a processor;

installing the updated firmware code in the second firmware component;

sending, from the first firmware component, the updated firmware code to a third firmware component;

activating the updated firmware code in the third firmware component, the third firmware component being in communication with the first firmware component, and the third firmware component not being a redundant firmware component for the first firmware component;

performing a fail-over from the first firmware component to the second firmware component such that a user communicating with the data processing system and receiving a service using the first firmware component continues to receive the service using the second firmware component without a disruption in the service, wherein performing the fail-over results in a fourth firmware component detecting a change in a code of the second firmware component and the fourth firmware component failing over to the third firmware component, and wherein the processor in the data processing system continues to execute the application without disruption during the fail-over from the first firmware component to the second firmware component in the data processing system;

detecting, at a fourth firmware component, that the first firmware component includes the updated firmware code, the fourth and the first firmware components being in communication with each other;

requesting, at the fourth firmware component and responsive to the detecting, the updated firmware code from the first firmware component; and rebooting the fourth firmware component with the updated firmware code.

2. The computer implemented method of claim 1, wherein activating the updated firmware code in the third firmware component further comprises:

installing the updated firmware code in the third firmware component; and booting up the third firmware component with the updated firmware code.

3. The computer implemented method of claim 1, wherein the first firmware component is a primary service controller, the second firmware component is a backup service controller, and wherein the computer implemented method further comprises:

queuing an instruction directed at the first firmware component; and processing, following performing the fail-over, the instruction at the second firmware component.

4. The computer implemented method of claim 1, further comprising:

taking a snapshot of a plurality of firmware components active in a network supported by the first and the second firmware components, the plurality of firmware components including a plurality of node controllers; and verifying, following performing the fail-over, that the plurality of firmware components are active in the network and communicating with the second firmware component.

5. A computer usable program product comprising a computer-usable storage device including computer usable code for updating firmware without disrupting service in a data processing system, the computer usable code comprising:

computer usable code for sending, from a source, an updated firmware code to a first firmware component and a second firmware component, the first firmware component being a primary firmware component and the second firmware component being a backup firmware component in a redundant firmware configuration in the data processing system where an application is executing using a processor;

computer usable code for installing the updated firmware code in the second firmware component;

computer usable code for sending, from the first firmware component, the updated firmware code to a third firmware component;

computer usable code for activating the updated firmware code in the third firmware component, the third firmware component being in communication with the first firmware component, and the third firmware component not being a redundant firmware component for the first firmware component;

computer usable code for performing a fail-over from the first firmware component to the second firmware component such that a user communicating with the data processing system and receiving a service using the first firmware component continues to receive the service using the second firmware component without a disruption in the service, wherein performing the fail-over results in a fourth firmware component detecting a change in a code of the second firmware component and the fourth firmware component failing over to the third firmware component, and wherein the processor in the data processing system continues to execute the application without disruption during the fail-over from the first firmware component to the second firmware component in the data processing system;

computer usable code for detecting, at a fourth firmware component, that the first firmware component includes the updated firmware code, the fourth and the first firmware components being in communication with each other;

computer usable code for requesting, at the fourth firmware component and responsive to the detecting, the updated firmware code from the first firmware component; and computer usable code for rebooting the fourth firmware component with the updated firmware code.

6. The computer usable program product of claim 5, wherein the computer usable code for activating the updated firmware code in the third firmware component further comprises:

computer usable code for installing the updated firmware code in the third firmware component; and computer usable code for booting up the third firmware component with the updated firmware code.

7. The computer usable program product of claim 5, wherein the first firmware component is a primary service controller, the second firmware component is a backup service controller, and wherein the computer usable program product further comprises:

computer usable code for queuing an instruction directed at the first firmware component; and computer usable code for processing, following performing the fail-over, the instruction at the second firmware component.

8. The computer usable program product of claim 5, further comprising:

computer usable code for taking a snapshot of a plurality of firmware components active in a network supported by the first and the second firmware components, the plurality of firmware components including a plurality of node controllers; and computer usable code for verifying, following performing the fail-over, that the plurality of firmware components are active in the network and communicating with the second firmware component.

9. The computer program product of claim 5, wherein the computer usable code is stored in a computer readable storage medium in a data processing system, and wherein the computer usable code is transferred over a network from a remote data processing system.

10. The computer program product of claim 5, wherein the computer usable code is stored in a computer readable storage medium in a server data processing system, and wherein the computer usable code is downloaded over a network to a remote data processing system for use in a computer readable storage medium associated with the remote data processing system.

11. A data processing system for updating firmware without disrupting service in a data processing system, the data processing system comprising:

a storage device including a storage medium, wherein the storage device stores computer usable program code; and a processor, wherein the processor executes the computer usable program code, and wherein the computer usable program code comprises:

computer usable code for sending, from a source, an updated firmware code to a first firmware component and a second firmware component, the first firmware component being a primary firmware component and the second firmware component being a backup firmware component in a redundant firmware configuration in the data processing system where an application is executing using the processor;

computer usable code for installing the updated firmware code in the second firmware component;

computer usable code for sending, from the first firmware component, the updated firmware code to a third firmware component;

computer usable code for activating the updated firmware code in the third firmware component, the third firmware component being in communication with the first firmware component, and the third firmware component not being a redundant firmware component for the first firmware component;

computer usable code for performing a fail-over from the first firmware component to the second firmware component such that a user communicating with the data processing system and receiving a service using the first firmware component continues to receive the service using the second firmware component without a disruption in the service, wherein performing the fail-over results in a fourth firmware component detecting a change in a code of the second firmware component and the fourth firmware component failing over to the third firmware component, and wherein the processor in the data processing system continues to execute the application without disruption during the fail-over from the first firmware component to the second firmware component in the data processing system;

computer usable code for detecting, at a fourth firmware component, that the first firmware component includes the updated firmware code, the fourth and the first firmware components being in communication with each other;

computer usable code for requesting, at the fourth firmware component and responsive to the detecting, the updated firmware code from the first firmware component; and computer usable code for rebooting the fourth firmware component with the updated firmware code.

12. The data processing system of claim 11, wherein the computer usable code for activating the updated firmware code in the third firmware component further comprises:

computer usable code for installing the updated firmware code in the third firmware component; and computer usable code for booting up the third firmware component with the updated firmware code.

13. The data processing system of claim 11, wherein the first firmware component is a primary service controller, the second firmware component is a backup service controller, and wherein the data processing system further comprises:

computer usable code for queuing an instruction directed at the first firmware component; and computer usable code for processing, following performing the fail-over, the instruction at the second firmware component.

14. The data processing system of claim 11, further comprising:

computer usable code for taking a snapshot of a plurality of firmware components active in a network supported by the first and the second firmware components, the plurality of firmware components including a plurality of node controllers; and computer usable code for verifying, following performing the fail-over, that the plurality of firmware components are active in the network and communicating with the second firmware component.

* * * * *